Sept. 17, 1957     H. W. SIMPSON     2,806,388

FORWARD AND REVERSE TRANSMISSION

Filed Aug. 20, 1956     2 Sheets-Sheet 1

INVENTOR.
Howard W. Simpson

Sept. 17, 1957     H. W. SIMPSON     2,806,388
FORWARD AND REVERSE TRANSMISSION
Filed Aug. 20, 1956     2 Sheets-Sheet 2
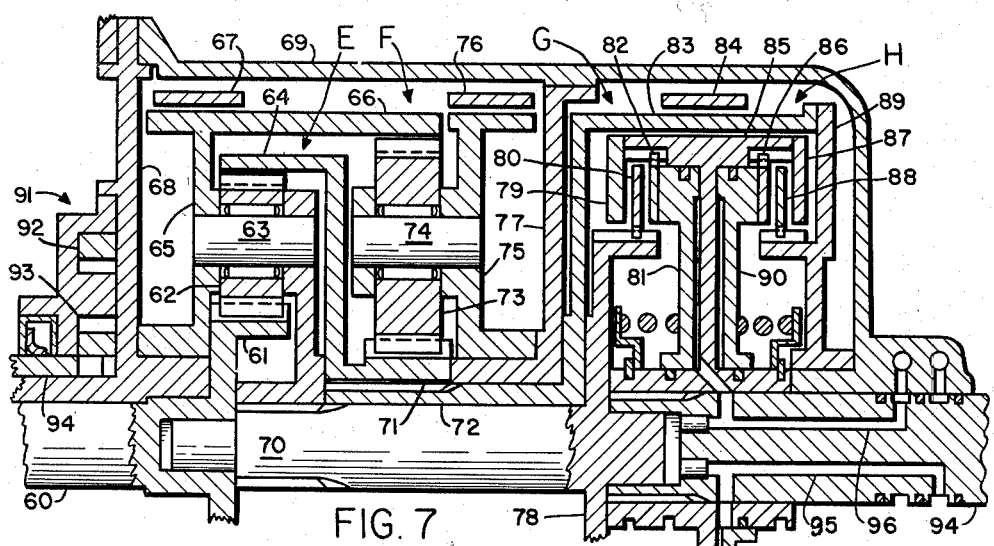
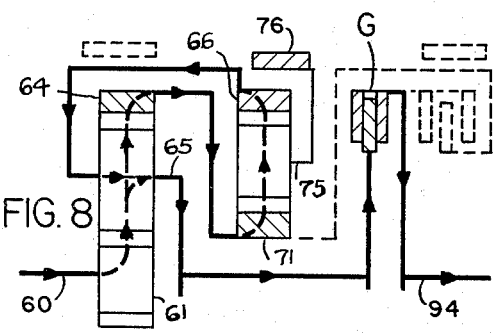
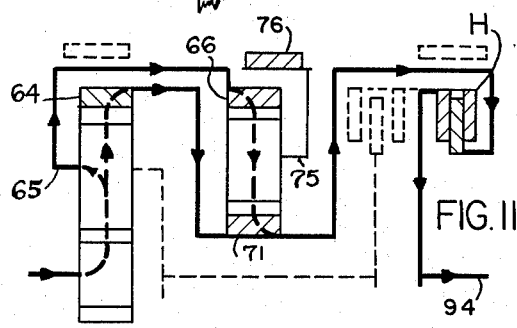
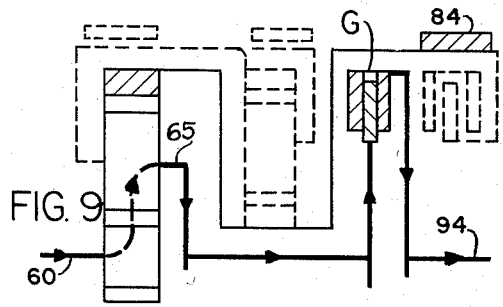
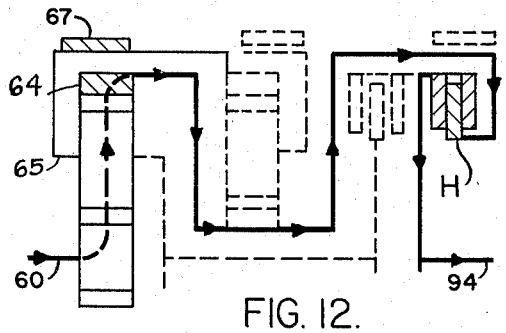
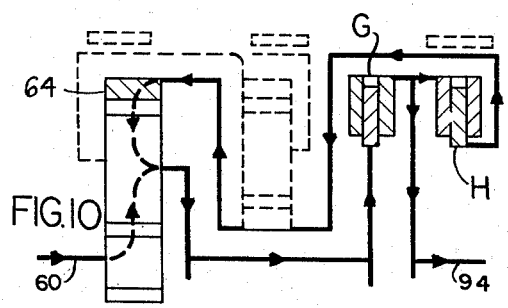
INVENTOR.
Howard W. Simpson

United States Patent Office 2,806,388
Patented Sept. 17, 1957

2,806,388

FORWARD AND REVERSE TRANSMISSION

Howard W. Simpson, Dearborn, Mich.

Application August 20, 1956, Serial No. 605,018

10 Claims. (Cl. 74—759)

This invention refers to planetary transmissions, particularly to those for track type vehicles which often move loads backward as well as forward, as for instance, a bulldozer.

Such vehicles usually have a pedal operated clutch and a clash type countershaft (sliding gear) transmission, having five speeds forward and two in reverse. This results in a large unit, with rough speed changes. Besides, the operator soon becomes fatigued due to his frequent operation of the clutch pedal and shift lever.

The present invention contemplates use of a fluid torque converter and hydraulically operated planetary gearing. With a torque converter three forward and two reverse speeds are ample because a variable speed reduction is obtained in the converter which provides a considerable range of speed in each of the forward and reverse transmission reduction ratios.

Heretofore obtaining three forward and two reverse speeds in a planetary transmission required complicated gearing, but in the present embodiment, they are all obtained with two simple planetary trains, a simple train being defined as consisting of a sun gear, an internal ring gear, and planet gears meshing with both the sun and the internal ring gear and each rotatably supported in a rotatable planet gear carrier, all of such gears lying in the same radial plane.

An object of this invention is therefore to obtain three speeds forward and two in reverse with a minimum of simple gearing in which tooth separating forces at the sun gears are balanced by those at the ring gears.

Another object is a wide ratio spread in both forward and reverse speeds.

Another object is to obtain a compact, efficient transmission with the minimum number of parts, to reduce the cost. Two friction clutches and three friction brakes are used to obtain various speeds and neutral.

Another object is to obtain low cost clutch structure by siamesing two clutches in a single housing.

Another object is to provide a transmission in which one clutch is engaged in all forward speeds only and a second clutch which remains engaged in both reverse speeds.

Another object is to locate the dual clutches so as to obtain a low relative speed of the clutch plates when disengaged, to avoid heating.

Another important object is provision for stationary structure to support the three brake drums so that little or no radial loads are imposed on continuously rotating parts.

Other objects and advantages will appear in the accompanying drawings, specifications and claims.

Figs. 1 and 7 are partial side elevations in section of two embodiments of my invention which incorporate all of the above objects.

Figs. 2, 3 and 4 are for low, second and direct forward drives respectively, and Figs. 5 and 6 are for low reverse and high reverse respectively.

Figs. 8 to 12 are diagrammatic partial elevations in section of the embodiment shown in Fig. 7 and shows by means of full and dotted lines and by arrows, the operation and torque paths for each speed. Figs. 8, 9 and 10 are for low, second and direct forward drives respectively, and Figs. 11 and 12 are for low and high reverse speeds respectively.

Figure 1:
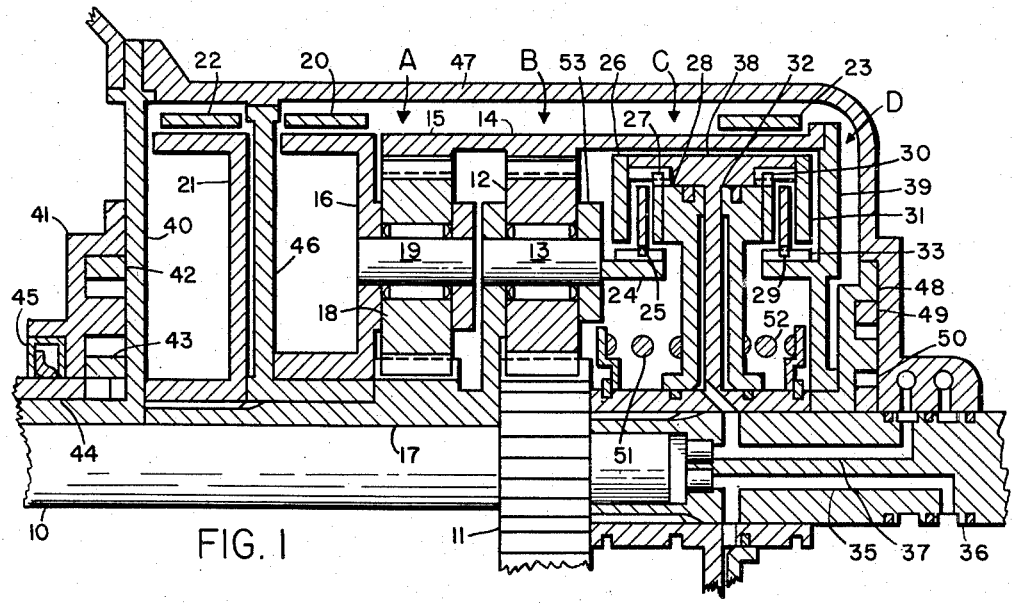

In Fig. 1 input shaft 10 drives sun gear 11 and is journaled in plate 40 which is fixed to housing 47. Gear set A comprises sun gear 17, ring gear 15 and planet gears, one of which, 18, is shown and rotates on rollers on pin 19 fixed in carrier 16.

Gear set B comprises sun gear 11, ring gear 14 integral with ring gear 15, and planet gears, one of which, 12, is shown rotatable on rollers on pin 13 fixed in carrier 53 which is integral with sun gear 17. Brake drum 21 is splined to sun gear 17 and carrier 53 and brake band 22 is adapted to hold drum 21 stationary. Sun gear 17 is journaled in plate 46 and is also rotatable on shaft 10. Carrier 16 has holding brake band 20 and is rotatably supported on the hub of plate 46.

Carrier 53 has a splined hub 24 which engages sliding clutch plate 25 of clutch C, and can be clamped between driven clutch plate 27 and pressure plate 26, attached to housing 38, by oil pressure through passage 37 which moves piston 28 against retracting spring 51.

Clutch drum 39 is attached to integral ring gears 14 and 15 and drives splined clutch plate 29 of clutch D, and can be clamped between driven clutch plate 30, splined to housing 38, and pressure plate 31, attached to housing 38, by oil pressure through passage 35, which moves piston 32 against retracting spring 52.

Brake band 23 is adapted to hold integral ring gears 14 and 15 against rotation. Output shaft 36 pilots the end of input shaft 10 and is splined to clutch housing 38. Sleeve 44 is driven by the engine (not shown) and drives pump gear 43 which meshes with pump gear 42 which is located eccentrically in pump housing 41. Seal 45 prevents oil leakage.

Pump gear 50 is driven by output shaft 36 and meshes with pump gear 49 located eccentrically in pump housing 48 which is attached to housing 47. Oil is supplied by both of the above pumps under pressure to operate clutches C and D and brake bands 22, 20 and 23. Plate 39 can rotate on pump housing 48 but can be held stationary by brake band 23.

Figure 2:
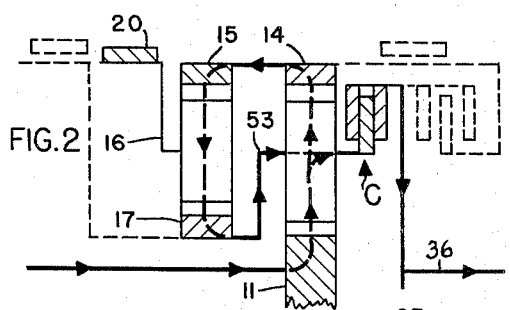
Figs. 2 to 6 are diagrammatic partial elevations in section of the embodiment of Fig. 1, showing by means of full and dotted lines, and by arrows, the operation and torque paths for each speed.

In Fig. 2, low speed, sun gear 11 drives carrier 53 forward and ring gears 14 and 15 backward. Carrier 16 is held by brake band 20 and sun gear 17 turns forward with carrier 53 which is coupled to output shaft 36 by clutch C. The parts shown in dotted lines in Figs. 2 to 6 are idling without load. Output torque is thus the sum of that of sun gear 17 and carrier 53.

Figure 3:
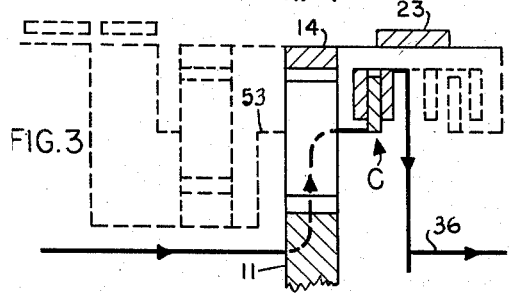

In Fig. 3, second speed, clutch C remains engaged but brake band 20 is released and brake band 23 holds ring gear 14. The output torque is now only that of carrier 53 which is obviously less than the combined torque of sun gear 17 and carrier 53 in Fig. 2.

Figure 4:
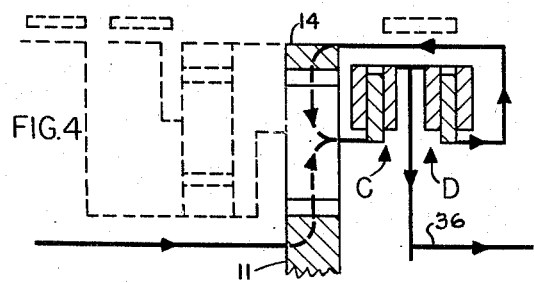

In Fig. 4, direct drive, both clutches C and D are engaged and all the brake bands are released. Clutch C transmits the input torque of sun gear 17 plus that of ring gear 14, but only input torque is transmitted to output shaft 36 because clutch D taps off the torque of ring gear 14 which is then transmitted in a closed circuit as shown by the arrows. The gears are all locked to rotate as a solid unit.

Figure 5:
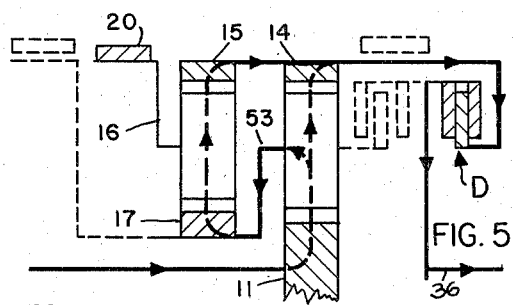

In Fig. 5, low reverse, brake band 20 holds carrier 16 and sun gear 11 drives ring gear 14 backward. At the same time carrier 53 turns slowly forward and integral sun gear 17 turns ring gear 15 backward also. The combined backward torque of ring gears 14 and 15 is transmitted to output shaft 36 by clutch D.

Figure 6:
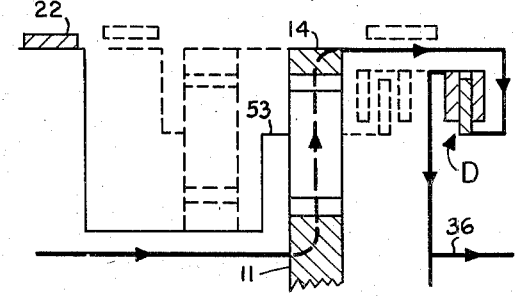

In Fig. 6, high reverse speed, clutch D remains engaged and brake band 22 holds carrier 53 so that ring gear 14 turns backward. Output shaft 36 now turns faster than in Fig. 5 because it is only carrying the torque of ring gear 14 instead of that of both ring gears 14 and 15.

With ring gears 14 and 15 both having 90 teeth and sun gears 11 and 17 both having 60 teeth the forward reduction ratios are 3.5, 2.5 and 1.0 to 1.0 for low, second and third speeds. In reverse the ratios are 5.25 and 1.5 to 1 for low and high reverse respectively.

In Fig. 7 input shaft 60 is journaled in plate 68 and is integral with sun gear 61 which meshes with several planets, one of which, 62, turns on pin 63 fixed in carrier 65. Ring gear 64 is integral with sun gear 71 which is splined to the hub 72 of drum 83. Carrier 65 of gear set E is integral with ring gear 66 of gear set F and is adapted to be held by brake band 67 but when not held carrier 65 can rotate on the hub of plate 68 attached to housing 69. Ring gear 66 and sun gear 71 mesh with planet gears, one of which, 73, is shown mounted on pin 74 fixed in carrier 75, which is rotatably supported on the hub of plate 77 which is fixed in housing 69. Brake bands 76 and 84 are adapted to hold carrier 75 and ring gear 64 respectively as reaction members.

Clutch G is driven by shaft 70 splined to carrier 65, and piloted at one end in input shaft 60 and at the other end in output shaft 94.

Clutch plate 80 is splined to slide on drum 78 which is integral with shaft 70, and clutch plate 82 is splined to slide in clutch housing 85 which in turn is splined to output shaft 94.

Plate 89 has sliding clutch plate 88 splined to its hub, and clutch plate 86 is splined to slide in housing 85. Pressure plates 79 and 87 are attached to housing 85 by screws not shown and receive the thrust when clutches G and H are engaged by pistons 81 and 90 repsectively, with oil under pressure through passages 96 and 95 respectively. Oil pressure is supplied by pump 91 which has gear 93 driven by sleeve 94, and gear 92.

In Fig. 8, low speed, input shaft 60 drives sun gear 61 which drives carrier 65 forward at reduced speed. Since ring gear 64 is not held it turns backward and since sun gear 71 is integral and carrier 75 is held by brake band 76, ring gear 66 is forced to turn forward and being connected to carrier 65 it adds to the torque delivered to output shaft 94 by clutch G which is shown engaged. Parts not engaged or idling are shown in dotted lines in Figs. 8 to 12.

In Fig. 9, second speed, carrier 65 is driven at reduced speed but since ring gear 64 is now held by brake band 84, carrier 65 turns faster than in low speed, and no torque is added from ring gear 66 which is now idling without load.

In Fig. 10, direct drive, both clutches G and H are engaged to lock up the gears shown in full lines.

Clutch G is subjected to the same multiplied torque as in Fig. 9 but clutch H feeds a portion back to ring gear 64 in the same way that partial torque is fed back to ring gear 14 in Fig. 4, so that, neglecting friction, the remaining torque at output shaft 94 is equal to that at input shaft 60.

In Fig. 11, low reverse speed, carrier 65 and ring gear 66 are driven forward at reduced speed. This causes sun gear 71 to turn backward since carrier 75 is held by brake band 76. At the same time ring gear 64 is forced to turn backward and, being integral with sun gear 71, its torque is added to that of sun gear 71. Clutch H transmits both torque increments to output shaft 94.

Fig. 12, high reverse speed, band 67 holds carrier 65 so that it is not allowed to turn forward as it does in Fig. 11. As a result ring gear 64 turns backward faster than in Fig. 11. Clutch H remains engaged thus transmitting the torque of ring gear 64 to output shaft 94 without any added increment.

In Figs. 7–12 the corresponding gears in sets E and F differ in diametral dimensions. With both gear sets alike as to number of teeth, and with the ring gears having 90 teeth and the sun gears having 60 teeth, the reduction ratio for Figs. 8 to 12 are 4.75, 2.5 and 1.0 to 1 for low, second and third speeds respectively, and 3.17 and 1.5 to 1 for the two reverse speeds.

While preferred embodiments have been described above in detail, it will be understood that numerous modifications might be resorted to without departing from the scope of my invention as defined in the following claims.

I claim:

1. In a power transmission, a planetary gear unit comprising two planetary gear sets each having a single ring gear, a single sun gear, and a carrier having planet gears each meshing with the sun and ring gears, said unit having the sun gear of one set connected to an input member, a first clutch for coupling the sun gear of the other set and a member of the said one set to an output member, a second clutch for coupling the ring gear of said other set and a member of said one set to said output member, a brake for holding the carrier of the said other set against rotation whereby, when the brake is applied and the first clutch is engaged, a first reduction ratio is obtained between the said input and output members, and when the brake is applied, the first clutch is released and the second clutch is engaged, a second reduction ratio is obtained between the said input and output members.

2. The combination set forth in claim 1 whereby, when said brake is released and both of said clutches are engaged, a direct drive through the transmission is obtained.

3. In the combination set forth in claim 1, a second brake for holding the members coupled by the first clutch for obtaining a third reduction ratio when the said second clutch and second brake are engaged and the other brake and first clutch are released.

4. In the combination set forth in claim 1, a third brake for holding the members coupled by the second clutch for obtaining a fourth reduction ratio when the said first clutch and third brake are engaged and the second clutch and the other brake are released.

5. In a power transmission, a planetary gear unit comprising two planetary gear sets each having a single ring gear, a single sun gear, and a carrier having planet gears each meshing with the sun and ring gears, said unit having the sun gear of one set connected to an input member, a first clutch for coupling the sun gear of the other set and a member of the said one set to an output member, a second clutch for coupling the ring gear of said other set and a member of said one set to said output member, a brake for holding the carrier of the said other set against rotation whereby, when the brake is applied and the first clutch is engaged, a first forward reduction ratio is obtained between the said input and output members and when the brake is applied, the first clutch is released and the second clutch is engaged, a reverse reduction ratio is obtained between the said input and out members.

6. The combination set forth in claim 5 whereby when said brake is released and both of said clutches are engaged, a direct drive through the transmission is obtained.

7. In the combination set forth in claim 5, a second brake for holding the members coupled by the first clutch for obtaining a third reduction ratio when the said second clutch and second brake are engaged and the other brake and first clutch are engaged.

8. In the combination set forth in claim 1, a third brake for holding the members coupled by the second clutch for obtaining a fourth reduction ratio when said first clutch and third brake are engaged and the second clutch and the other brake are released.

9. In a power transmission, a planetary gear unit comprising two planetary gear sets each having a single ring gear, a single sun gear, and a carrier having planet gears each meshing with the sun and ring gears, said unit having the sun gear of one set connected to an input member, a first clutch for coupling the sun gear of the other set and a member of the said one set to an output member, a second clutch for coupling the ring gear of said other set and a member of said one set to said output member, a brake for holding the carrier of the said other set against rotation whereby, when the brake is applied and the first clutch is engaged, a first reduction ratio is obtained between the said input and output members and when the brake is applied, the first clutch is released and the second clutch is engaged, a second reduction ratio is obtained between the said input and output members; a second brake for holding the members coupled by the first clutch for obtaining a third reduction ratio when the said second clutch and second brake are engaged and the other brake and first clutch are released; a third brake for holding the members coupled by the second clutch for obtaining a fourth reduction ratio when the said first clutch and third brake are engaged and the second clutch and the other brake are released.

10. In a power transmission, a planetary gear unit comprising two planetary gear sets each having a single ring gear, a single sun gear, and a carrier having planet gears each meshing with the sun and the ring gears, said unit having the sun gear of one set connected to an input member, a first clutch for coupling the sun gear of the other set and a member of the said one set to an output member, a second clutch for coupling the ring gear of said other set and a member of said one set to said output member, a brake for holding the carrier of the said other set against rotation whereby, when the brake is applied and the first clutch is engaged, a first forward reduction ratio is obtained between the said input and output members and when the brake is applied, the first clutch is released and the second clutch is engaged, a reverse reduction ratio is obtained between the said input and output members; a second brake for holding the members coupled by the first clutch for obtaining a third reduction ratio when the said second clutch and second brake are engaged and the other brake and first clutch are engaged; a third brake for holding the members coupled by the second clutch for obtaining a fourth reduction ratio when said first clutch and third brake are engaged and the second clutch and the other brake are released.

No references cited.